(12) United States Patent
Walker (10) Patent No.: US 9,317,278 B1
(45) Date of Patent: Apr. 19, 2016

(54) UPDATING SHARED ACCESS MACHINE-READABLE CODE

(71) Applicant: Damien N. Walker, Pace, FL (US)

(72) Inventor: Damien N. Walker, Pace, FL (US)

(73) Assignee: Duran Walker Group, LLC, Pace, FL (US)

( * ) Notice: Subject to any disclaimer, the term of this patent is extended or adjusted under 35 U.S.C. 154(b) by 0 days.

(21) Appl. No.: 14/262,548

(22) Filed: Apr. 25, 2014

(51) Int. Cl.
   *G06F 9/44* (2006.01)
   *G06F 9/445* (2006.01)

(52) U.S. Cl.
   CPC .. *G06F 8/65* (2013.01); *G06F 8/60* (2013.01); *G06F 8/67* (2013.01); *G06F 8/70* (2013.01); *G06F 8/71* (2013.01)

(58) Field of Classification Search
   None
   See application file for complete search history.

(56) References Cited

U.S. PATENT DOCUMENTS

| | | | |
|---|---|---|---|
| 6,134,558 A | 10/2000 | Hong et al. | |
| 6,351,751 B1 | 2/2002 | Traversat et al. | |
| 7,133,880 B1 | 11/2006 | Nori et al. | |
| 7,328,222 B2 | 2/2008 | Keith et al. | |
| 8,225,310 B1* | 7/2012 | Robertson | G06F 8/65 717/171 |
| 2003/0066065 A1* | 4/2003 | Larkin | G06F 8/65 717/177 |
| 2009/0044182 A1* | 2/2009 | Quin | G06F 8/65 717/168 |
| 2009/0138870 A1* | 5/2009 | Shahindoust et al. | 717/172 |
| 2010/0107150 A1* | 4/2010 | Kamada | G06F 8/65 717/170 |
| 2010/0169876 A1* | 7/2010 | Mann | G06F 8/65 717/170 |
| 2011/0078675 A1* | 3/2011 | Van Camp | G06F 8/65 717/170 |
| 2013/0067599 A1* | 3/2013 | Raje | G06F 8/65 717/173 |
| 2013/0263104 A1* | 10/2013 | Baset | G06F 8/70 717/168 |
| 2013/0275553 A1* | 10/2013 | Shilo | H04L 67/1095 709/217 |
| 2014/0223423 A1* | 8/2014 | Alsina | G06F 8/65 717/173 |

OTHER PUBLICATIONS

Hicks, Michael, et al., "Dynamic Software Updating", 2001, pp. 13-23.*
Makris, Kristis, et al., "Immediate Multi-Threaded Dynamic Software Updates Using Stack Reconstruction", 2009, pp. 1-14.*
Ajmani, Sameer, "Automatic Software Upgrades for Distributed Systems (PhD thesis)", 2005, pp. 103-133.*
Gu, Tianxiao, et al., "Javelus: A Low Disruptive Approach to Dynamic Software Updates" 2012, pp. 527-536.*
Neamtiu, Iulian, et al., "Safe and Timely Dynamic Updates for Multi-threaded Programs", 2009, pp. 13-24.*
Zhen-hai, Xiong, et al., "Automatic Updating Method Based on Maven", 2014, pp. 1074-1077.*

* cited by examiner

*Primary Examiner* — Thuy Dao
*Assistant Examiner* — Christopher Franco
(74) *Attorney, Agent, or Firm* — John R. Casperson

(57) ABSTRACT

A computer system is provided comprising a client computer, a management server computer, and a communications network. The client computer includes hardware and software for executing an application utilizing data, files and code downloaded from the management server computer. The management server computer includes the data, files and code required by the client computer for executing the application. The management server computer includes hardware and software for registering the client computer to receive electronic change notifications for any updates made to the data, files and code at the management server computer. The client computer includes hardware and software for updating data, files and code from the management server computer prior to further execution of the application with any outdated data, files or code once an electronic change notification has been received.

20 Claims, 6 Drawing Sheets

UPDATING SHARED ACCESS MACHINE-READABLE CODE

BACKGROUND OF THE INVENTION

Making updates to computer programs which have been distributed to multiple users or updates to items of machine-readable code which are accessible to multiple users such as web pages or shared databases is without interrupting or interfering with the users or making different updates available to different users has long been a problem.

It is an object of this invention to make machine-readable code updates to multiple users in an improved fashion.

SUMMARY OF THE INVENTION

In one embodiment of the invention, there is provided a computer system comprising a client computer, a management server computer, and a communications network. The client computer includes hardware and software for executing an application utilizing data, files and code downloaded from the management server computer. The management server computer includes the data, files and code required by the client computer for executing the application. The communications network is for conveying a request from the client computer to the management server computer for the data, files and code and for downloading the data, files and code from the management server computer to the client computer. The management server computer includes hardware and software for registering the client computer to receive electronic change notifications for any updates made to the data, files and code at the management server computer. The client computer includes hardware and software for updating data, files and code from the management server computer prior to further execution of the application with any outdated data, files or code once an electronic change notification has been received.

In another embodiment of the invention, there is provided a method for managing application code, data and files being used in remote systems by distributing these items from a single source and flagging the items for updates. In the method, a request is received on a first client machine to execute an application utilizing data, files and code residing on a management server. A request is sent over a communications network to the management server for the code. The management server fills the request from a local file system and registers a change notification for the code. The code is returned over the communications network to a repository client residing on the first client machine. The repository client dynamically assembles the code and makes the code available as an application to further execute the request. A request is sent over the communications network to the management server for the data and files for use by the application. The management server fills the request from the local file system and registers a change notification for the requested data and files. The requested data and files is returned over the communications network to the repository client for use in the application.

In the event of that an update is received at the management server for any of code, data or other files, an update notification can be sent to the first client so that steps can be taken to update the code, data or other files at the first client before the first client takes further action involving the changed items.

In another embodiment of the invention, there is provided a method for coordinating usage of a database that is maintained in a repository and that is being updated as it is used. In the method, a repository management server receives an electronic request for machine-readable code stored in a repository computer memory served by the repository management server. The management retrieves the requested machine-readable code from the repository computer memory and electronically transmits it to the requestor. The requestor electronically stores the transmitted machine-readable code in a requestor computer device. The repository management server registers the transmitted machine-readable code for update notifications from the repository management server. At least one proposed update to the previously transmitted data is received electronically at the repository management server from an editor. The repository management server accepts the at least one proposed update, stores the accepted update in the repository computer memory and deletes any outdated machine-readable code that has been superseded by updated machine-readable code. The update notification is transmitted to the requestor and outdated machine-readable code is replaced on the requestor's computer with updated machine-readable code prior to a next access by the requestor's computer of any outdated machine-readable code.

DETAILED DESCRIPTION OF THE INVENTION

Figure 1:
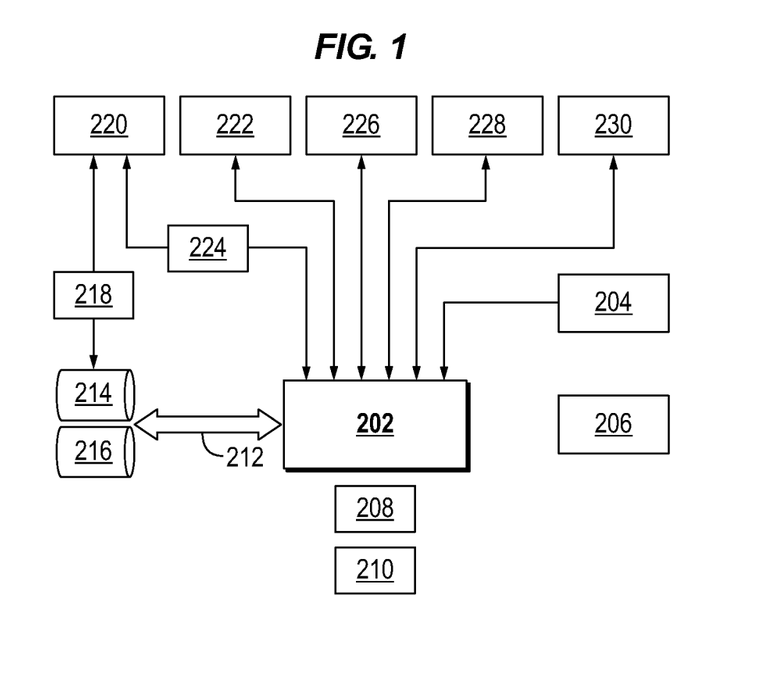
FIG. 1 is a box system diagram illustrating certain transactions which can be carried out with embodiments of the present invention.
Figure 2:
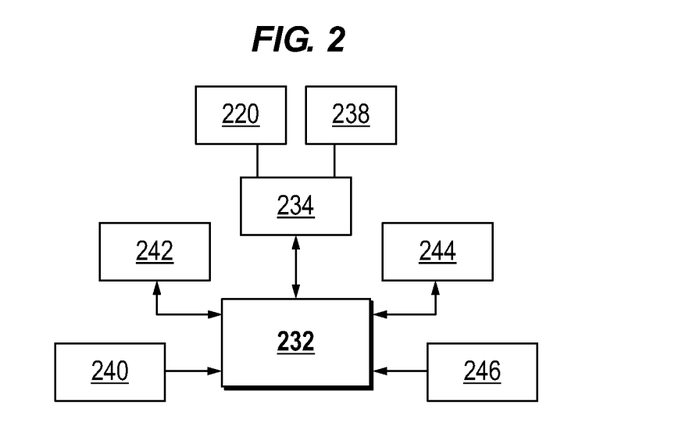
FIG. 2 is a box diagram of overall system architecture which can be employed in an embodiment of the invention.
Figure 3:
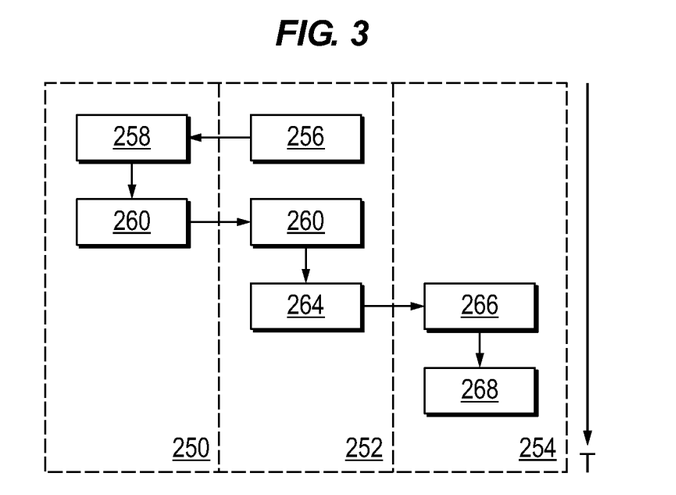
FIG. 3 is a sequence diagram illustrating conducting an Administrative Data Modification according to an embodiment of the invention.
Figure 4:
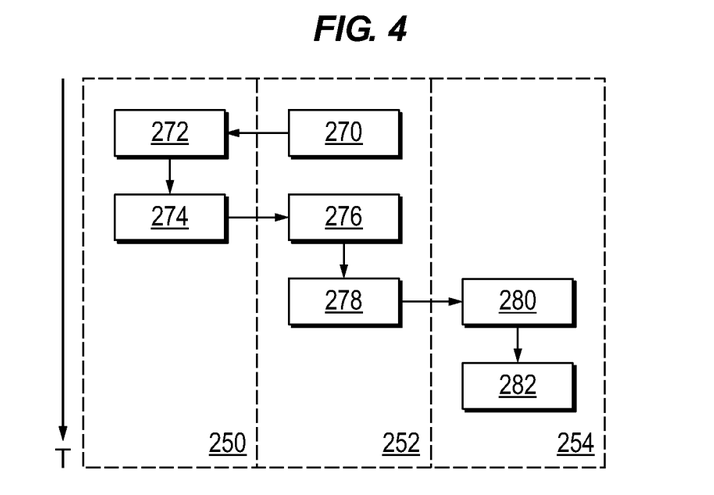
FIG. 4 is a sequence diagram illustrating conducting an Administrative Code Modification according to an embodiment of the invention.
Figure 5:
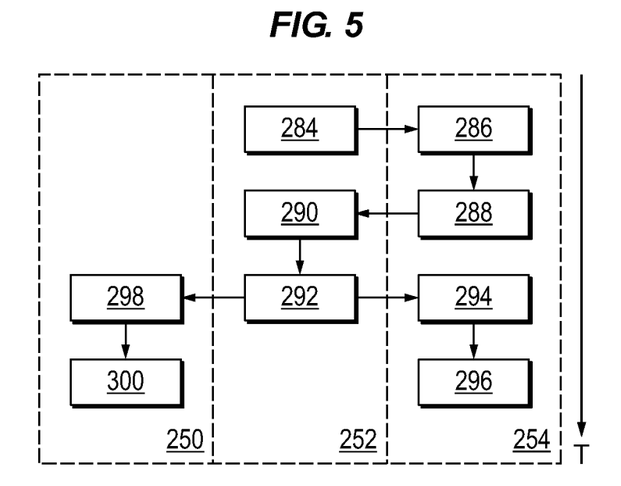
FIG. 5 is a sequence diagram illustrating conducting a Data Modification from the Client or Target Application according to an embodiment of the invention.
Figure 6:
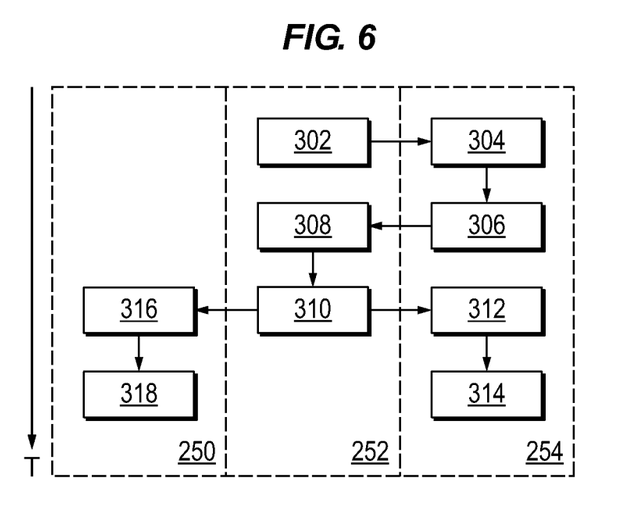
FIG. 6 is a sequence diagram illustrating conducting an Application Code Modification from the Client or Target according to an embodiment of the invention.
Figure 7:
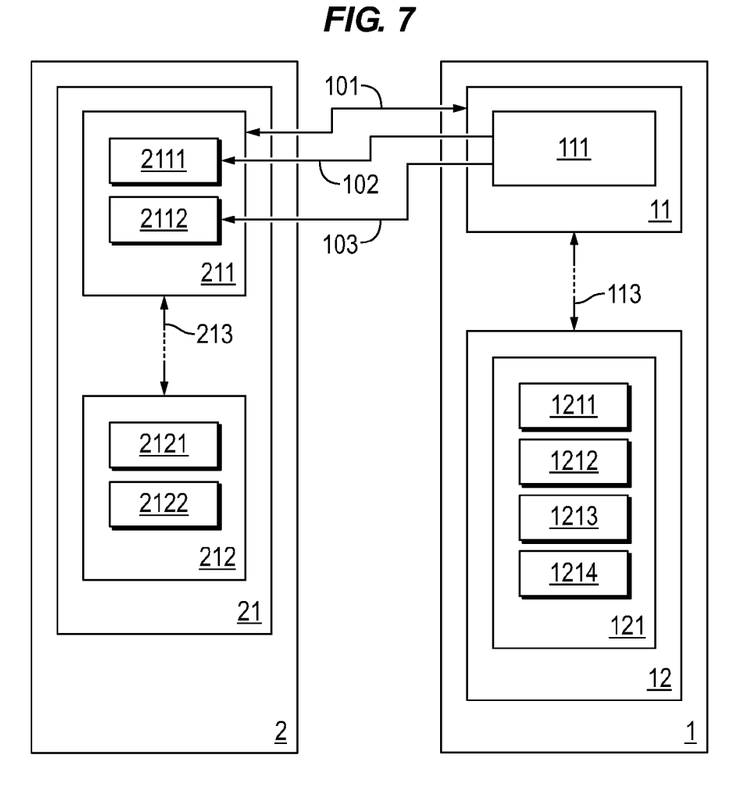
FIG. 7 is a box diagram illustrating certain features of a repository server and client system according to an embodiment of the invention.
Figure 8:
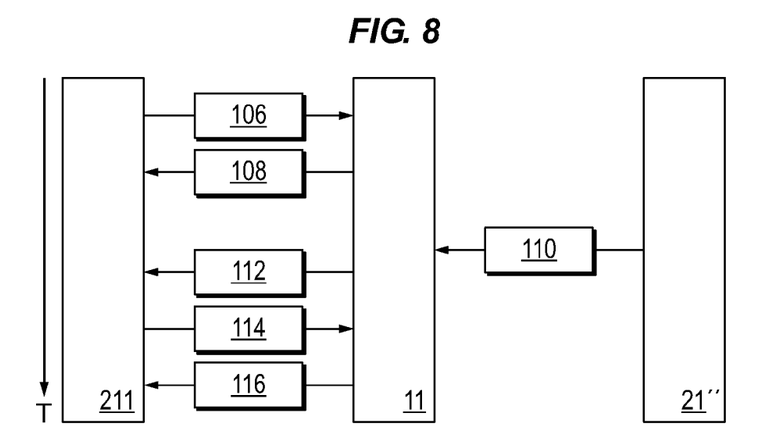
FIG. 8 is a Sequence diagram illustrating the Repository Management System issuing Code Change Notification to a client.
Figure 9:
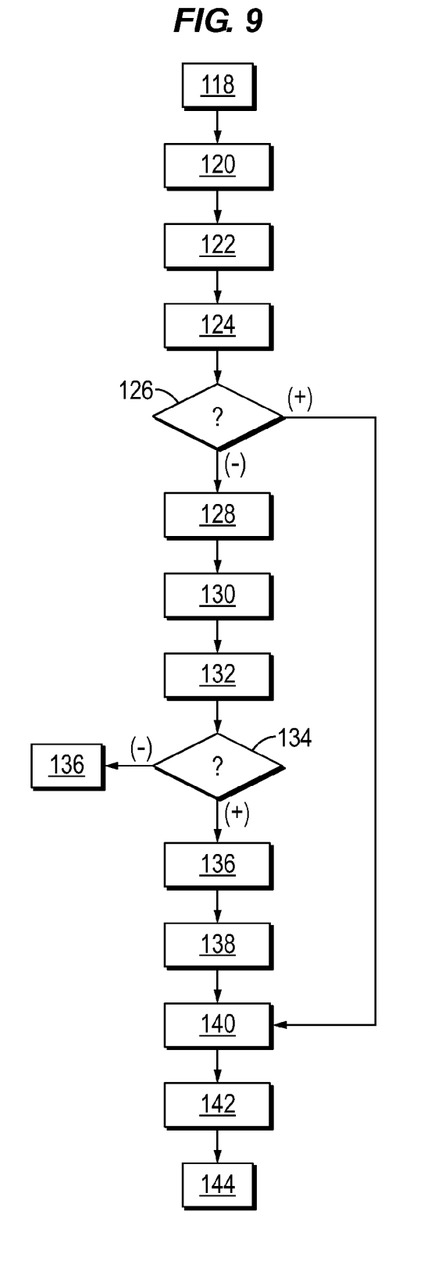
FIG. 9 is a Flow Chart illustrating a Client for the Repository Management System making an HTML file request for a Web/Ecommerce application.
Figure 10:
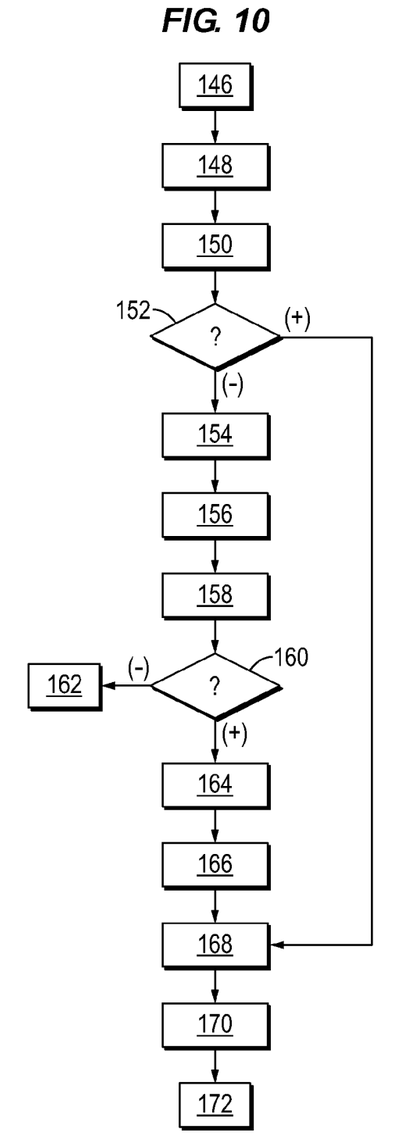
FIG. 10 is a Flow Chart illustrating a Client for the Repository Management System generating a User Interface for a Desktop Application.
Figure 11:
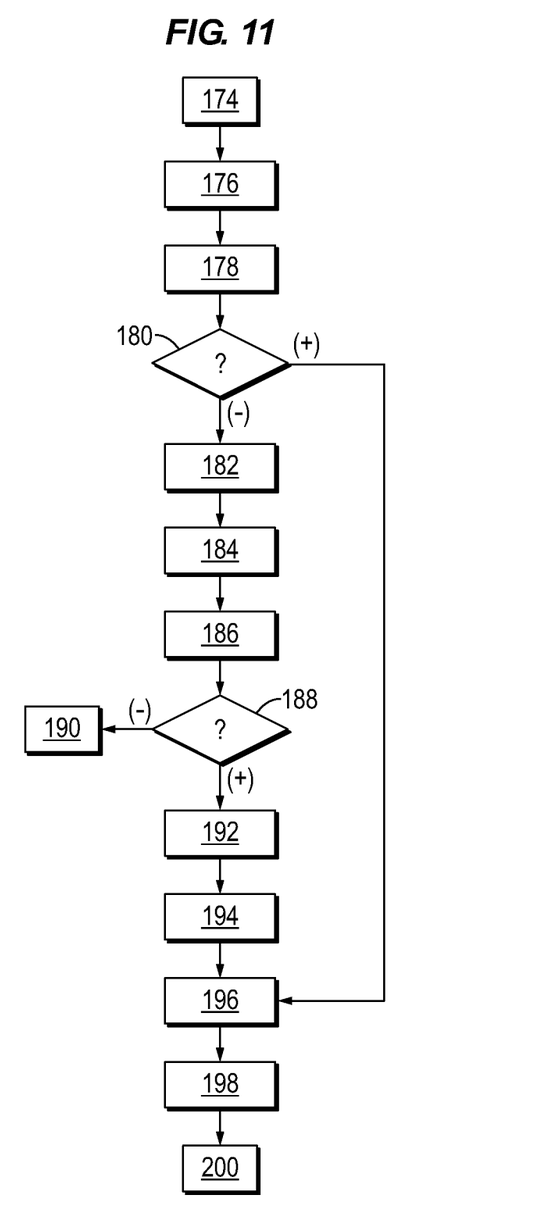
FIG. 11 is a Flow Chart illustrating a Client for the Repository Management System requesting a dynamic class load for a Web/Ecommerce application.

In one embodiment of the invention, there is provided a computer system comprising a client computer, a management server computer, and a communications network. The client computer includes hardware and software for executing an application utilizing data, files and code downloaded from the management server computer. The management server computer includes the data, files and code required by the client computer for executing the application. The communications network is for conveying a request from the client computer to the management server computer for the data, files and code and for downloading the data, files and code from the management server computer to the client computer. The management server computer includes hardware and software for registering the client computer to receive electronic change notifications for any updates made to the data, files and code at the management server computer. The client computer includes hardware and software for updating data, files and code from the management server computer prior to further execution of the application with any outdated data, files or code once an electronic change notification has been received.

In preferred embodiments, the client computer comprises a cache memory for storing the data and files and a JVM for executing the code. The management server computer has a repository for storing the data, files and code. The data is in the form of Java serialized objects stored in the form of a hybrid object oriented/relational database and the code is in the form of Java class files. The application executes without XML or SQL mapping. An administrative console is in communication with the management server for managing the data in the repository.

In another embodiment of the invention, there is provided a method for managing application code, data and files being used in remote systems by distributing these items from a single source and flagging the items for updates. In the method, a request is received on a first client machine to execute an application utilizing data, files and code residing on a management server. A request is sent over a communications network to the management server for the code. The management server fills the request from a local file system and registers a change notification for the code. The code is returned over the communications network to a repository client residing on the first client machine. The repository client dynamically assembles the code and makes the code available as an application to further execute the request. A request is sent over the communications network to the management server for the data and files for use by the application. The management server fills the request from the local file system and registers a change notification for the requested data and files. The requested data and files is returned over the communications network to the repository client for use in the application.

Preferably, when an update is received to the requested data and files at the repository management server, the requested data and files at the repository management server is replaced with the update. The change notification is sent to a repository cache manager in the first client machine. The requested data and files are deleted from a data repository in the first client machine. A request is sent over the communications network to the management server from the first client machine for the update when called for use by the application which is filled at the management server repository local file system. The repository management system registers a change notification for the update. The update is returned over the communications network to the first client machine client for use in the application.

The request for the code is preferably filled at the management server repository by retrieving a class file containing the code. The class file is downloaded to a class loader in the first client machine and made available for use in the first client machine in a JVM runtime environment. The data preferably comprises serialized objects.

The update can be received from a console physically operably associated with the repository, or from a second client machine through the communications network. The number of client machines linked to the repository is limited only by practical considerations.

In another embodiment of the invention, there is provided a method for coordinating usage of a database that is maintained in a repository and that is being updated as it is used. In the method, a repository management server receives an electronic request for machine-readable code stored in a repository computer memory served by the repository management server. The management retrieves the requested machine-readable code from the repository computer memory and electronically transmits it to the requestor. The requestor electronically stores the transmitted machine-readable code in a requestor computer device. The repository management server registers the transmitted machine-readable code for update notifications from the repository management server. At least one proposed update to the previously transmitted data is received electronically at the repository management server from an editor. The repository management server accepts the at least one proposed update, stores the accepted update in the repository computer memory and deletes any outdated machine-readable code that has been superseded by updated machine-readable code. The update notification is transmitted to the requestor and outdated machine-readable code is replaced on the requestor's computer with updated machine-readable code prior to a next access by the requestor's computer of any outdated machine-readable code.

The machine-readable code can be selected from application code, data from a database, and other files such as image files or sound files. Preferably the machine-readable code comprises Java application data, files and code. Preferably, the database is a hybrid object-oriented/relational database and it is transmitted for use with previously transmitted application code. Where the application is to display web pages, the machine-readable code generally further comprises image files.

Data from the database is preferably stored in a cache memory of the requestor's computer device and at least a portion of the data is removed from the cache memory in response to the update notification concerning the data.

The requestor's computer device preferably includes a software shell to assemble the application code into a functional application and the application code is reloaded from the repository in response to the update notification concerning the application code.

Updates are preferably made by first initiating a transaction session for receiving proposed updates into the repository management server from the editor. All updates proposed during the session are recorded. The proposed updates are committed to the repository at the end of the transaction session if all the proposed updates were successfully received and valid, and the update notification is transmitted at the close of the transaction session. An update notification is preferably also transmitted to the editor.

In a preferred embodiment, a separate modification space is provided for each transaction session and the proposed updates are recorded and available to only to that transaction session.

Further Description of Preferred Embodiments

One preferred embodiment of the invention provides a repository management system for defining, creating, persisting, delivering and assembling Java application data, files and code provided.

One example is a client/server environment in which a repository management system resides and is initialized on the management server and a repository client resides and is initialized on a client machine.

The client and the server may reside on the same physical machine, but it is not necessary.

The repository client may receive a request to execute an application utilizing data, files and code residing on the Management Server. First, the repository client sends a request to the repository management system for all code required.

The management system retrieves the class file from the local file system, registers a change notification for the requested class file and then returns the requested code to the repository client.

The repository client then dynamically assembles the provided code and makes this code available for use within the JVM runtime environment for the request.

The repository client then send requests to the repository management system for any data and/or files requested via the Repository API within the executing application code provided.

The repository management System retrieves data (Serialized Objects) and files from the local file system, registers a change notification for the requested data and files and then returns the data and files requested to the repository client for use within the application.

All changes occurring through the repository management system to any of the application data, files or code will result in a change notification being sent from the repository management system to the repository client which results in the changed data, file or code being discarded and reloaded from the repository management system upon the next request for that data, file or code.

Access permissions to the local file system is determined by the Operating System user executing the Repository Management System application the server.

The framework of a preferred embodiment of the invention provides a method for the development, management, storage and delivery of application code, data and files to remote systems. The framework is divided into three application layers, a repository layer, and administration layer, and a target application layer.

The repository layer provides a storage and delivery mechanism by means of a hybrid relational/object-oriented database, preferably written in Java. The repository allows different applications to work together and to communicate by means of notifications. The repository not only stores data, but also code and content. Applications have the ability to receive notifications about modifications made to the database by other applications, and act in response, for example, by being reassembled or by deleting and updating their cache.

As an example, Application A could modify code, data or content of another Application B based on a modification or series of modifications to a third Application C. Application A could also modify multiple other applications based on specific ordered changes in applications B and C. Applications are automatically notified of modification to their codes and are reassembled during their runtime.

The administration layer provides a development and management environment by means of individual graphical user interface applications imbedded within a single host console application. These applications interact with the repository as described previously to allow users to create, update or delete application code, data or files.

The target application layer which interacts with the repository as previously described to assemble the application code, data and files required for execution. Since the repository is object oriented, no data mapping is required for assembly. Target applications continue to interact with the repository during run time to receive and deliver application code, data, files or modifications.

In contrast to previous methods, which must divide development, management, storage and delivery into completely separate and isolated applications, one preferred embodiment of the invention supplies a seamless collaboration within the framework to provide a single administration point for all target applications and an awareness between applications and layers which allows for real time responsiveness to any change within the framework. The result is a more intelligent and productive system with increased usability, control and manageability while providing previously unattainable levels of interaction between the framework applications.

Additionally, one preferred embodiment of the invention provides compliance with the principles of the ACID model {Atomicity, Consistency, Isolation, Durability) of database design while providing the speed and agility inherent to the No SQL Base modeled databases. Atomicity is assured by initializing a modification transaction for each repository session. The transaction records all changes requested during the session and commits those changes to the database upon success or rolls the changes back in the case of failure. If one part of the transaction fails, the entire transaction fails. All modifications strictly follow the "all or nothing" rule. Consistency is assured by requiring, in each session transaction, that all modifications be valid and successful to allow the commit to succeed. If, for any reason, a modification fails, the entire transaction will be rolled back automatically and the database returned to the last consistent state. Isolation is assured by maintaining a separate modification space for each session where the modification is recorded and available to only that transaction. Therefore, no transaction is aware of modifications performed within any other transaction. Upon successful execution of a commit, the global state is updated to reflect the transaction modifications. Upon rollback or a transaction-time-out-induced automatic rollback, the transaction modification space is cleared and all modifications are discarded. Durability is assured by logging each committed transaction for recovery in the case of failures.

Further, one preferred embodiment of the invention provides an application programming interface that unifies the communication for accessing repository data and content. The interface provides auditing, authentication and encryption functions. The auditing function provides observation capabilities for monitoring user actions. The Authentication function provides repository data and content to only valid and verified users. The Encryption function stores and delivered sensitive data in encrypted form only.

The application programming interface (API) for accessing the repository provides access only to authorized clients to ensure that proper permissions are granted for read and write activities. The permissions are granted from the repository's host operating system.

The auditing function includes a messaging system for activity tracking. Messages notifying of all modifications are sent to all registered users of the repository. Application registration is available to client applications through the repository APIs.

The authentification function requires that each client must provide a valid user name and password to gain access to the repository for any operation.

The encryption function provides the ability to mark sensitive data as encrypted. All data defined to be encrypted will be both stored and delivered as the encrypted value. All calls to create such data should be transmitted via a secure protocol such as HTTPS (Hyper-Text Transfer Protocol Secure)

One important aspect of a preferred embodiment of the invention is a repository which utilizes the hybridization of object oriented and relational database concepts to maximize performance and flexibility while minimizing overhead. Since there is no XML (Extensible Markup Language) or SQL (Structured Query Language) mapping required for object initialization, a reduction in application load times can be observed as well as a reduction in development time. There are also increased search and query response speeds due to the unique use of relation concepts. While data is stored as serialized objects, the repository also stores code and files as well. The repository client API allows access to all stored content and provides built in session based transaction management, version control, file locking, session crash recovery and operating system based file security as well as encryption. These features ensure that the framework adheres to the ACID model of database design. The repository also provides a messaging system which monitors changes to all content and allows both target and administration applications to register for and receive notifications based on event type.

A preferred embodiment of the invention utilizes an administration console that is a desktop application developed in Java that allows individually packaged applications to be executed as plugins. The repository API is exposed to all executed applications and therefore requires no additional integration considerations. This provides the ability to quickly develop customized administration application for individual customer needs. For example, a "Page Manager" plug-in for web developers and a "Data Manager" plug in for loading, viewing and managing data.

The target applications in a preferred embodiment of the invention are developed in Java and utilize the repository API and custom class loader to assemble the code, data and files required. An example of a target application is a web or web service application, but it could be any application developed using the repository API. Target applications can be deployed on any Java enabled device.

Preferred embodiment of the present invention are further explained in the attached drawings, in which the reference numerals are defined as follows:

DRAWING REFERENCES

1 Management Server
2 Client Machine
11 Repository Management System
111 Notification System
21 Client Application
211 Repository Client
2111 Repository Cache Manager
2112 Repository Class Loaders
212 Dynamically Loaded Code
2121 Remote Data Object
2122 Remote File
213 Repository Application Program Interface (API)
12 Local File System
121 Repository Context
1211 Data (Serialized Objects)
1212 Object Indexes
1213 Files
1214 Code (Class Files)
113 Repository Application Program Interface (API)
101 Client/Server Protocol
102 Notification
103 Notification
21' Client Application 1
22" Client Application 2
106 Request application code
108 Return application code
110 Update application code
112 Notify of code change
114 Request application code
116 Return application code
118 Start
120 Client web application receives request for HTML file
122 Client web appl. attempts to retrieve the HTML file from the Repository client
124 Repository Client consults repository cache for HTML file
126 Found? Yes(+), No(−)
128 Open a session with Repository Management System
130 Send request to Repository Management System for HTML file
132 Repository Management System consults the local file system for HTML file
134 Found? Yes(+), No(−)
136 Repository Management System Streams HTML file
138 Repository Client puts returned HTML file in cache and closes session
140 Repository Client returns HTML file to Client application
142 Client web application writes HTML content to output stream
144 End
146 Start
148 Client Desktop application is executed to user
150 Client appl. attempts to load the UI objects from the Repository Class Loader
152 Found? Yes (+), No (−)
154 Open a session with Repository Management System
156 Send request to Repository Management System for class files
158 Repository Management System consults the local file system for class file
160 Found? Yes (+), No (−)
162 Return not found error
164 Repository Management System streams class files
166 Repository Class Loader loads class files into JVM and closes session
168 Repository Class Loader returns class generated objs to Client Desktop Appl.
170 Client Desktop Application executes object code to generate User Interface
172 End
174 Start
176 Client web Appl receives request for dynamic content generated by object code
178 Client Appl attempts to load the object from the Repository Class Loader
180 Found? Yes (+), No (−)
182 Open a session with Repository Management System
184 Send request to Repository Management system for class file
186 Repository Management System consults the local file system for the class file
188 Found? Yes (+), No (−)
190 Return not found error
192 Repository Management System stream class file
194 Repository Class Loader loads class file into JVM and closes session
196 Repository Class Loader returns class generated object to Client web Appl.
198 Client web application executes object code
200 End 202 Repository
204 Console
206 Lock and Transaction Management
208 Control Client privileges and repository structure
210 Messaging System for endpoint notifications
212 Template defines create, read, update and delete (CRUD)
214 Database Management System (DBMS)
216 Database Management System (DBMS)
218 Participates in XA transactions
220 Web Application
222 Mobile Application
224 Can be connected as Java Connector Architecture (JCA) adapter
226 Desktop Application
228 Grade of Service-Mobile
230 Grade of Service
232 Repository
234 Console
236 Data Administration Graphical User Interface (GUI)
238 Code/Content Administration GUI
240 Target: Desktop Application
242 Target: Kiosk Application
244 Target: Web Application
246 Target: Mobile Application
250 Administration GUI
252 Repository
254 Target Applications
256 Session Transaction
258 Data Loaded
260 Data Modified
262 Transaction Commit
264 Notification Message Sent
266 Notification Message Received
268 Remove Cached Data
270 Session transaction
272 Data Loaded
274 Code Modified
276 Transaction Commit
278 Notification Message Sent
280 Notification Message Received
282 Reload Code
284 Session Transaction
286 Data Loaded
288 Data Modified
290 Transaction Commit
292 Notification Message Sent
294 Notification Message Received
296 Remove Cached Data
298 Notification Message Received
300 Remove Cached Data
302 Session Transaction
304 Code Loaded
306 Code Modified
308 Transaction Commit
310 Notification Message Sent
312 Notification Message Received
314 Reload Code
316 Notification Message Received
318 Reload Code While certain preferred embodiments have been described herein, the invention is not to be construed as being so limited, except to the extent that such limitations are found in the claims.

What is claimed is:

1. A method comprising
receiving, from a requestor, at a repository management server, an electronic request for machine-readable code stored in a repository computer memory served by the repository management server,
retrieving the requested machine-readable code from the repository computer memory,
electronically transmitting the retrieved machine-readable code to the requestor,
electronically storing the transmitted machine-readable code in a requestor computer device,
registering the transmitted machine-readable code for update notifications from the repository management server,
receiving, electronically from an editor, at the repository management server, at least one proposed update to the transmitted machine-readable code,
accepting the at least one proposed update,
storing the at least one accepted update to the machine-readable code in the repository computer memory and deleting any outdated machine-readable code that has been superseded by updated machine-readable code,
transmitting the update notification to the requestor,
replacing outdated machine-readable code on the requestor's computer device with updated machine-readable code prior to a next access by the requestor's computer device of any outdated machine-readable code,
wherein the machine-readable code comprises data from a database,
and wherein data from the database is stored in a cache memory of the requestor's computer device and at least a portion of the data is automatically removed from the cache memory in response to the update notification.

2. A method as in claim 1 wherein the machine-readable code further comprises application code.

3. A method as in claim 1 wherein the machine-readable code further comprises image files.

4. A method as in claim 1 wherein the database is a hybrid object oriented/relational database.

5. A method as in claim 2 wherein the machine-readable code further comprises image files.

6. A method as in claim 2 wherein the requestor's computer device includes a software shell to assemble the application code into a functional application and the application code is reloaded from the repository in response to the update notification.

7. A method as in claim 1 further comprising
initiating a transaction session for receiving proposed updates into the repository management server from the editor,
recording all updates proposed during the session, and
committing the proposed updates to the repository at the end of the transaction session if all the proposed updates were successfully received and valid,
wherein
the update notification is transmitted at the close of the transaction session.

8. A method as in claim 7 further comprising transmitting an update notification to the editor.

9. A method as in claim 7 further comprising
maintaining a separate modification space for each transaction session wherein the proposed updates are recorded and available to only to that transaction session.

10. A method as in claim 1 wherein the machine-readable code comprises Java application data, files and code.

11. A method comprising
receiving a request on a first client machine to execute an application utilizing data, files and code residing on a management server, sending a request over a communications network to the management server for the code, filling the request at a management server repository from a local file system, registering a change notification for the code at the management server, returning the code over the communications network to a repository client residing on the first client machine, dynamically assembling the code in the repository client and making the code available as an application to further execute the request, sending a request over the communications network to the management server for the data and files for use by the application, filling the request at the management server repository local file system, registering a change notification for the requested data and files at the management server, returning the requested data and files over the communications network to the repository client for use in the application, receiving an update to the requested data and files at the repository management server, replacing the requested data and files at the repository management server with the update, sending the change notification to a repository cache manager in the first client machine, deleting the requested data and files from a data repository in the first client machine, sending a request over the communications network to the management server from the first client machine for the update when called for use by the application, filling the request at the management server repository local file system, registering a change notification in the repository management system for the update, and returning the update over the communications network to the first client machine client for use in the application.

12. A method as in claim 11 wherein the request for the code is filled at the management server repository by retrieving a class file containing the code, the class file is downloaded to a class loader in the first client machine and made available for use in the first client machine in a Java Virtual Machine runtime environment.

13. A method as in claim 11 wherein the data comprises serialized objects.

14. A method as in claim 11 wherein the update is received from a console physically operably associated with the repository.

15. A method as in claim 11 wherein the update is received from a second client machine through the communications network.

16. A computer system comprising a client computer comprising hardware and software for executing an application utilizing data, files and code downloaded from a management server computer, a management server computer having the data, files and code required by the client computer for executing the application, a communications network for conveying a request from the client computer to the management server computer for the data, files and code and for downloading the data, files and code from the management server computer to the client computer, said management server computer having hardware and software for registering the client computer to receive electronic change notifications for any updates made to the data, files and code at the management server computer, wherein the updates comprise data from a database, and wherein data from the database is stored in a cache memory of the requestor's computer device and at least a portion of the data is automatically removed from the cache memory in response to the update notification, said client computer having hardware and software for updating data, files and code from the management server computer prior to further execution of the application with any outdated data, files or code once an electronic change notification has been received by sending a request over the communications network to the management server for updated data, files or code for which an electronic change notification has been received when the outdated data, files or code is called for use by the application.

17. A computer system as in claim 16 wherein the client computer comprises a cache memory for storing the data and files and a Java Virtual Machine for executing the code.

18. A computer system as in claim 17 wherein the management server computer has a repository for storing the data, files and code, the data being in the form of Java serialized objects stored in the form of a hybrid object oriented/relational database and the code being in the form of Java class files.

19. A computer system as in claim 18 wherein the application executes without Extensible Markup Language or Structured Query Language mapping.

20. A computer system as in claim 19 further comprising an administrative console in communication with the management server for managing data in the repository.

* * * * *